US012669833B2

(12) United States Patent
Ni et al.

(10) Patent No.: US 12,669,833 B2
(45) Date of Patent: Jun. 30, 2026

(54) METHOD, APPARATUS AND SYSTEM FOR AGV MOVEMENT CONTROL

(71) Applicant: ABB SCHWEIZ AG, Baden (CH)

(72) Inventors: Yaodong Ni, Shanghai (CN); Xuan Cao, Shanghai (CN); Dong Wu, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/676,085

(22) Filed: May 28, 2024

(65) Prior Publication Data

US 2024/0319744 A1 Sep. 26, 2024

Related U.S. Application Data

(63) Continuation of application No. PCT/CN2021/134096, filed on Nov. 29, 2021.

(51) Int. Cl.
*G05D 1/644* (2024.01)
*G05D 105/28* (2024.01)

(52) U.S. Cl.
CPC ..... *G05D 1/644* (2024.01); *B65G 2203/0216* (2013.01); *B65G 2203/046* (2013.01); *G05D 2105/28* (2024.01)

(58) Field of Classification Search
CPC ............... G05D 1/644; G05D 2105/28; B65G 2203/0216; B65G 2203/046
USPC ......................................................... 701/25
See application file for complete search history.

(56) References Cited

U.S. PATENT DOCUMENTS

| | | | |
|---|---|---|---|
| 2014/0209020 A1 | 7/2014 | Burke | |
| 2019/0310626 A1* | 10/2019 | Salour .................. | G05D 1/0289 |
| 2019/0332096 A1 | 10/2019 | Porter et al. | |
| 2021/0114809 A1* | 4/2021 | Agarwal ............... | B65G 1/065 |
| 2021/0300440 A1 | 9/2021 | Sindhuja et al. | |
| 2022/0073105 A1* | 3/2022 | Osawa ..................... | G06N 3/08 |

FOREIGN PATENT DOCUMENTS

| | | |
|---|---|---|
| CN | 107390692 A | 11/2017 |
| CN | 107479545 A | 12/2017 |
| CN | 107571702 A | 1/2018 |
| CN | 107764256 A | 3/2018 |
| CN | 108227476 A | 6/2018 |
| CN | 109814548 B | 5/2019 |
| CN | 109933064 A | 6/2019 |
| CN | 111781818 A | 10/2020 |
| CN | 112141111 A | 12/2020 |
| WO | 2023123281 A1 | 7/2023 |

* cited by examiner

*Primary Examiner* — Mahmoud S Ismail
(74) *Attorney, Agent, or Firm* — Greenberg Traurig, LLP

(57) ABSTRACT

Embodiments of the present disclosure provide methods, devices, systems, and a computer readable medium for controlling an automatic guided vehicle (AGV). In some embodiments of the method, a first load identifier is determined at a first location on a predetermined trajectory of the AGV. The first load identifier represents a first load condition at the first location. A first set of values of a plurality of control parameters is determined based on the first load identifier. A movement of the AGV is controlled based on the first set of values. With these embodiments, the movement of the AGV can be controlled according to a set of values of control parameters based on the load condition.

11 Claims, 10 Drawing Sheets

200

DETERMINE A FIRST LOAD IDENTIFIER AT A
FIRST LOCATION ON A PREDETERMINED
TRAJECTORY OF AN AGV                          210

DETERMINE A FIRST SET OF VALUES OF A
PLURALITY OF CONTROL PARAMETERS
BASED ON THE FIRST LOAD IDENTIFIER           220

CONTROL A MOVEMENT OF THE AGV BASED          230
ON THE FIRST SET OF VALUES

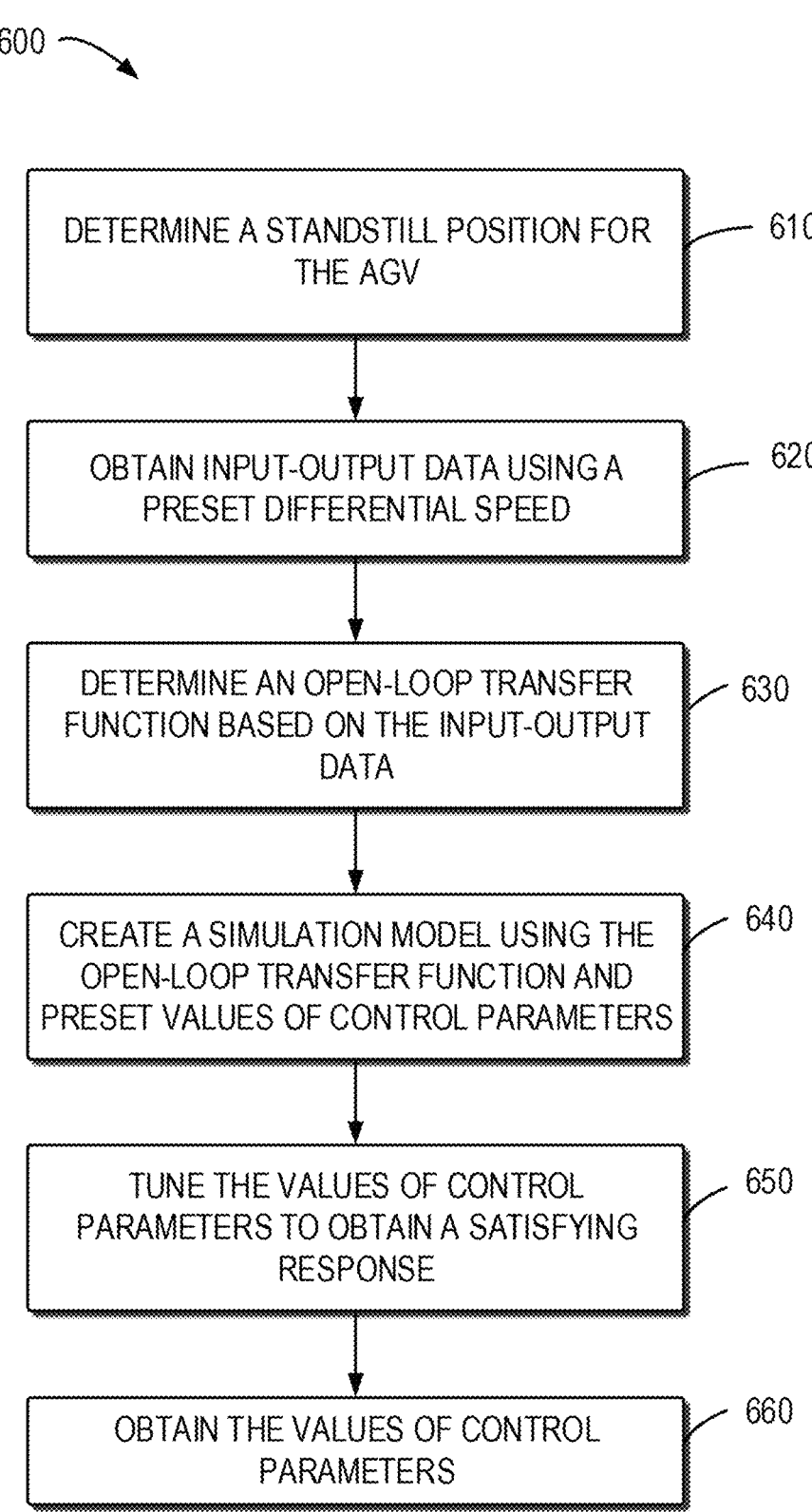

600

DETERMINE A STANDSTILL POSITION FOR THE AGV — 610

OBTAIN INPUT-OUTPUT DATA USING A PRESET DIFFERENTIAL SPEED — 620

DETERMINE AN OPEN-LOOP TRANSFER FUNCTION BASED ON THE INPUT-OUTPUT DATA — 630

CREATE A SIMULATION MODEL USING THE OPEN-LOOP TRANSFER FUNCTION AND PRESET VALUES OF CONTROL PARAMETERS — 640

TUNE THE VALUES OF CONTROL PARAMETERS TO OBTAIN A SATISFYING RESPONSE — 650

OBTAIN THE VALUES OF CONTROL PARAMETERS — 660

AUTO OR MANUAL?

MANUAL

AUTO

820

DETERMINE A NEW LOAD ID?   N

Y

830

DETERMINE A TARGET SET OF VALUES OF CONTROL PARAMETERS BASED ON THE NEW LOAD ID

840

RECEIVE A USER SELECTED LOAD ID?   N

Y

850

DETERMINE A TARGET SET OF VALUES OF CONTROL PARAMETERS BASED ON THE USER SELECTED LOAD ID

860

APPLY THE TARGET SET OF VALUES

1000

1100

METHOD, APPARATUS AND SYSTEM FOR AGV MOVEMENT CONTROL

CROSS-REFERENCE TO RELATED APPLICATIONS

This is a continuation application claiming priority to international patent application Serial No.: PCT/CN2021/134096, filed on Nov. 29, 2021; which is herein incorporated by reference in its entirety.

FIELD

Example embodiments of the present disclosure generally relate to industrial control, and more specifically, to method, apparatus, system and computer readable medium for controlling an automatic guided vehicle (AGV).

BACKGROUND

With the development of computer and automatic control, various kinds of automatic devices have been widely utilized in the manufacturing industry. For example, an AGV can be used in a manufacturing plant for material handling or transferring. The AGV refers to a transport vehicle or a handling vehicle that is capable of traveling along a prescribed guiding trajectory. Controlling the movement of the AGV such as navigation and positioning of the AGV is generally important in practice of the AGV.

During the material handling or transferring process, it needs to ensure the efficiency of logistics transportation and the accuracy requirements of the AGV's pose. For example, the deviation caused by the initial pose of AGV needs to be eliminated in a short time. In addition, it also needs to ensure that the AGV will travel fast and steadily along the path in subsequent movement. It is desirable to provide an improved solution of AGV movement control.

SUMMARY

Example embodiments of the present disclosure provide solutions for AGV movement control.

In a first aspect, example embodiments of the present disclosure provide a method for controlling an AGV. The method comprises: determining a first load identifier at a first location on a predetermined trajectory of the AGV, the first load identifier representing a first load condition at the first location; determining a first set of values of a plurality of control parameters based on the first load identifier; and controlling a movement of the AGV based on the first set of values.

With these embodiments, it can control the movement of the AGV based on values of control parameters determined based on the load identifier which represents the load condition. At this point, the movement of AGV can adapt to different load conditions. Thus, it can ensure a satisfying tracking performance of the AGV under different load conditions. Therefore, the movement control of the AGV such as navigation and positioning of the AGV may be implemented in a more convenient and effective way. In addition, compared with a regular way for controlling the AGV using adjustable control parameters such as using fuzzy proportional-integral-derivative (PID) control, the application may shield the complexity of the control algorithm from the user. Thus, it may provide a convenience way for the AGV movement control.

In some embodiments, the method further comprises: determining, based on a plurality of load conditions of the predetermined trajectory, a plurality of segments of the predetermined trajectory, each segment being associated with a respective load identifier representing a respective load condition. With these embodiments, the predetermined trajectory of the AGV can be divided into segments based on different load conditions. Different segments are associated with different load identifiers. Thus, movement of the AGV along different segments of the predetermined trajectory can be controlled based on different load identifiers. In this way, the user may intuitively plan the task according to the change of the load condition in the process to obtain a satisfying tracking performance of the AGV. Therefore, the accuracy of the movement trajectory of the AGV may be further increased effectively.

In some embodiments, for each segment of the plurality of segments, a load identifier marker is located at a starting point of the given segment, the load identifier marker indicating a respective load identifier of the given segment; determining the first load identifier comprises: in response to detect a load identifier marker by a detector at the first location, determining the first load identifier based on the detected load identifier marker. With these embodiments, different segments can be marked with different load identifiers at the starting point of each segment. Thus, it can switch the values of control parameters at the starting point of each segment. Compared with a regular way for controlling the AGV based on fixed values of the control parameters along the whole trajectory, the values of the control parameters can be adjusted according to different load identifiers in different segments of the trajectory. Therefore, the accuracy of the movement trajectory of the AGV may be further increased effectively.

In some embodiments, the load identifier marker comprises one of: a radio frequency identification (RFID) tagger, or a Quick Response (QR) code; and the detector comprises one of: a RFID tagger reader, or a QR code reader. With these embodiments, the RFID tagger or the QR code may be used as the load identifier marker. The RFID tagger and the QR code are easy to be generated with a smaller size and a high precision. Therefore, the RFID tagger and the QR code may facilitate the movement control in an easy and effective way.

In some embodiments, controlling the movement of the AGV based on the first set of values comprises: in accordance with a determination that the AGV is located in a first segment associated with the first load identifier, controlling the movement of the AGV based on the first set of values. With these embodiments, the movement of the AGV along each segment of the predetermined trajectory can be controlled based on respective load identifier. Therefore, the accuracy of the movement trajectory of the AGV may be further increased effectively.

In some embodiments, controlling the movement of the AGV based on the first set of values comprises: determining, by a position sensor, a current position deviation of the AGV in relative to the predetermined trajectory; determining a differential speed based on the current position deviation and the first set of values; and determining a left speed and a right speed for a left wheel and a right wheel of the AGV based on the differential speed. With these embodiments, it may determine the wheel speeds of the AGV based on the deviation in relative to the predetermined trajectory and the values of control parameters according to the respective load condition. Therefore, the accuracy of the movement trajectory of the AGV may be further increased effectively.

In some embodiments, the plurality of control parameters comprise: a proportional gain, an integration time, and a derivation time, or the plurality of control parameters comprise: a proportional gain, an integration time, a derivation time, and a filter time. With these embodiments, it may apply a PID control or an improved PID control to control the movement of the AGV along each segment. In this way, it may have the advantages of simple structure, easy implementation and good robustness.

In some embodiments, the method further comprises: determining a plurality of candidate sets of values of the plurality of control parameters based on a plurality of load conditions and an estimated transfer function of the AGV, each candidate set of values being associated with a respective load identifier representing a respective load condition; and determining the first set of values based on the first load identifier comprises: selecting, from the plurality of candidate sets of values, a set of values associated with the first load identifier as the first set of values. With these embodiments, it may apply a PID control or an improved PID control to control the movement of the AGV along each segment. In this way, it may predetermine a plurality of candidate sets of values for the plurality of control parameters through self-tuning of control parameters. In this way, it may greatly reduce the debugging time when controlling the AGV.

In some embodiments, the method further comprises: receiving a trigger indicating a second load identifier different from the first load identifier; and controlling the movement of the AGV based on a second set of values of the plurality of control parameters corresponding to the second load identifier, the second set of values being different from the first set of values. With these embodiments, the user may change the values of the control parameters manually by input a trigger indicating a use selected load identifier. In this way, the AGV can be controlled both automatically and manually. In addition, this kind of manual control will be suitable for controlling the AGV in emergency situations or in failure process.

In some embodiments, the first load condition comprises at least one of: a weight of a load carried by the AGV, a weight of a towing cart driven by the AGV, and a friction of wheels of the AGV. With these embodiments, it may consider various load conditions such as the load weight, the towing cart weight and the wheel friction. In this way, it may determine more adaptive values of control parameters based on the load conditions. Therefore, the accuracy of the movement trajectory of the AGV may be further increased effectively.

In a second aspect, example embodiments of the present disclosure provide an apparatus for controlling an AGV. The apparatus comprises: a load identifier determining unit for determining a first load identifier at a first location on a predetermined trajectory of the AGV, the first load identifier representing a first load condition at the first location; a control parameter determining unit for determining a first set of values of a plurality of control parameters based on the first load identifier; and a controlling unit for controlling a movement of the AGV based on the first set of values.

In some embodiments, the apparatus further comprises: a trajectory segment determining unit for determining, based on a plurality of load conditions of the predetermined trajectory, a plurality of segments of the predetermined trajectory, each segment being associated with a respective load identifier representing a respective load condition.

In some embodiments, for each segment of the plurality of segments, a load identifier marker is located at a starting point of the given segment, the load identifier marker indicating a respective load identifier of the given segment; and the load identifier determining unit comprises: a first load identifier determining unit for determining the first load identifier based on a detected load identifier marker in response to detect a load identifier marker by a detector at the first location.

In some embodiments, the load identifier marker comprises one of: a radio frequency identification (RFID) tagger, or a Quick Response (QR) code; and wherein the detector comprises one of: a RFID tagger reader, or a QR code reader In some embodiments, the controlling unit comprises: a movement controlling unit for in accordance with a determination that the AGV is located in a first segment associated with the first load identifier, controlling the movement of the AGV based on the first set of values.

In some embodiments, the controlling unit comprises: a deviation determining unit for determining, by a position sensor, a current position deviation of the AGV in relative to the predetermined trajectory; a differential speed determining unit for determining a differential speed based on the current position deviation and the first set of values; and a speed determining unit for determining a left speed and a right speed for a left wheel and a right wheel of the AGV based on the differential speed.

In some embodiments, the plurality of control parameters comprise: a proportional gain, an integration time, and a derivation time, or the plurality of control parameters comprise: a proportional gain, an integration time, a derivation time, and a filter time.

In some embodiments, the apparatus further comprises: a candidate value determining unit for determining a plurality of candidate sets of values of the plurality of control parameters based on a plurality of load conditions and an estimated transfer function of the AGV, each candidate set of values being associated with a respective load identifier representing a respective load condition; and the control parameter determining unit comprises: a selecting unit for selecting, from the plurality of candidate sets of values, a set of values associated with the first load identifier as the first set of values.

In some embodiments, the apparatus further comprises: a receiving unit for receiving a trigger indicating a second load identifier different from the first load identifier; and a further controlling unit for controlling the movement of the AGV based on a second set of values of the plurality of control parameters corresponding to the second load identifier, the second set of values being different from the first set of values.

In some embodiments, the first load condition comprises at least one of: a weight of a load carried by the AGV, a weight of a towing cart driven by the AGV, and a friction of wheels of the AGV.

In a third aspect, example embodiments of the present disclosure provide a system for controlling an AGV. The system comprises: a computer processor coupled to a computer-readable memory unit, the memory unit comprising instructions that when executed by the computer processor implement the method for controlling an AGV.

In a fourth aspect, example embodiments of the present disclosure provide a system for controlling an AGV. The system comprises: a computer processor coupled to a computer-readable memory unit, the memory unit comprising instructions that when executed by the computer processor implements the method for controlling an AGV.

DESCRIPTION OF DRAWINGS

FIG. 6 illustrates a flowchart of a method for determining values of the control parameters based on the load ID in accordance with embodiments of the present disclosure;

Throughout the drawings, the same or similar reference symbols are used to indicate the same or similar elements.

DETAILED DESCRIPTION OF EMBODIMENTS

Figure 1:
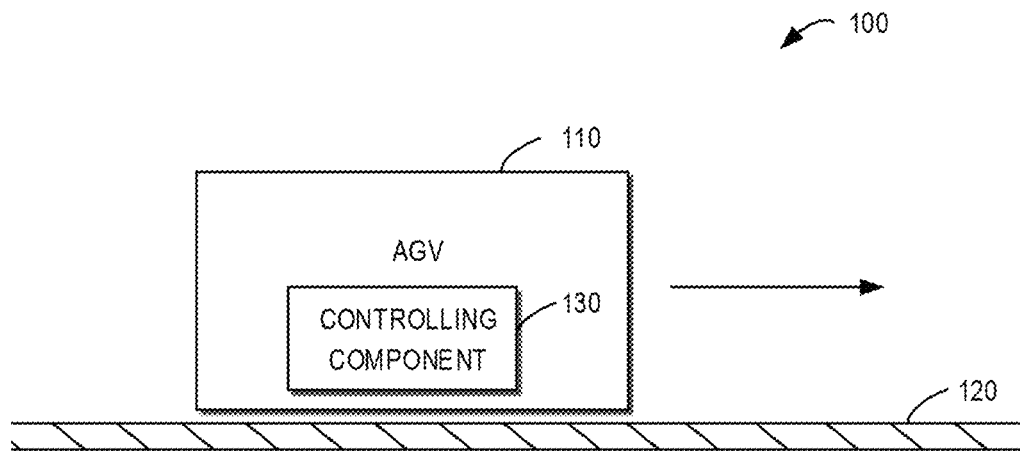
FIG. 1 illustrates an example environment in which various embodiments for AGV movement control in accordance with embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As mentioned above, an automatic device such as the AGV can be used in a manufacturing plant for material handling or transferring. As used herein, the automatic device can be referred to as an "AGV", a "transport device" or a "handling device". Controlling the movement of the AGV such as navigation and positioning of the AGV is generally important in practice of the AGV. Reference will be made to FIG. 1 for describing an example environment 100 in which various embodiments for AGV movement control in accordance with embodiments of the present disclosure.

As illustrated in FIG. 1, an AGV 110 is moving on a predetermined trajectory 120. The predetermined trajectory 120 refers to a prescribed guiding path or route along which the AGV 110 is desired to travel. It is to be understood that the predetermined trajectory 120 may be of different shapes, such as a circular trajectory, an elliptical trajectory, a straight trajectory or any other suitable regular or irregular trajectory. Examples of predetermined trajectory 120 may be described in details with respect to FIG. 3 below.

In some example embodiments, the AGV 110 may be automatically controlled and guided in a non-contact way. For example, magnetic tapes may be attached onto a floor surface to establish the predetermined trajectory 120. In this situation, navigation of the AGV 110 is realized through magnetic induction signals.

Alternatively, or in addition, the AGV 110 may be automatically controlled and guided by using simultaneous localization and mapping (SLAM) or visual SLAM (VSLAM). For example, in the example of using the SLAM, a laser sensor may be configured to be communicably coupled to the AGV 110 for localization. In the example of using the VSLAM, a camera may be configured to be communicably coupled to the AGV 110 for localization.

As illustrated in FIG. 1, the AGV 110 comprises a controlling component 130. The controlling component 130 controls movement of the AGV 110. The controlling component 130 may be integrated with the AGV 110 or may be separately and coupled to the AGV 110. The controlling component 130 may comprise a controller, a microcontroller, or other suitable element.

In some example embodiments, the AGV 110 may also comprise additional components (not shown), such as a safety component, a load handling component, a driving component, a battery and a motor. For example, the loading handling component will carry a load for example a loaded material. The controlling component 130 may control the driving component to change speed of the AGV 110.

Conventionally, it has been proposed to control the movement of the AGV by using a PID controller. The function of PID controller is to calculate the difference between the set value and the actual value and obtain the deviation. The PID controller will generate a correction value through a linear combination of proportional, integral and derivative part to adjust the movement of the AGV. Such approach can have a good tracking control performance under a same load condition. However, the AGV often faces a changeable and uncertain environment during operation. Such PID control cannot be effectively applied to various load conditions. In addition, the adjustment of control parameters depends on the experience of the commission engineer, which requires repeated trials and costs long commission time.

It has also been proposed to apply a fuzzy PID controller into the AGV movement control. The fuzzy PID controller is a combination of fuzzy controller and self-tuning of PID control parameters. The fuzzy PID controller introduces dynamic values of control parameters to allow the PID control dynamically adjusting its parameters according to load conditions. However, such fuzzy control require a lot of practical experience and data support, which will be subject to human factors and cannot be fully summarized. In addition, the fuzzy control always needs to be readjusted, which consumes the commission engineer a lot of time and energy and brings great inconvenience.

It is desirable to provide an improved solution of AGV movement control. According to embodiments of the present disclosure, an improved solution is proposed. In this solution, the movement of the AGV is controlled based on control parameter values determined based on the load identifier. The load identifier represents a corresponding load condition and is determined at a corresponding location on the predetermined trajectory of the AGV. In this way, it may control the movement of the AGV using control parameter values determined based on the load condition.

With such improved solution, the movement control of the AGV can adapt to different load conditions. Thus, it can ensure a satisfying tracking performance of the AGV under different load conditions. Therefore, the movement control of the AGV such as navigation and positioning of the AGV may be implemented in a more convenient and effective way. In addition, compared with a regular way for controlling the AGV using adjustable control parameters such as using fuzzy PID control, the application may shield the complexity of the control algorithm from the user. Thus, it may provide a convenience way for the AGV movement control. Moreover, compared with a regular way for controlling the AGV based on fixed values of the control parameters along the whole trajectory, the values of the control parameters can be adjusted according to different load identifiers in different segments of the trajectory. Therefore, the accuracy of the movement trajectory of the AGV may be further increased effectively.

Hereinafter, some example embodiments of the present disclosure will be described in detail with reference to the accompanying drawings.

Figure 2:
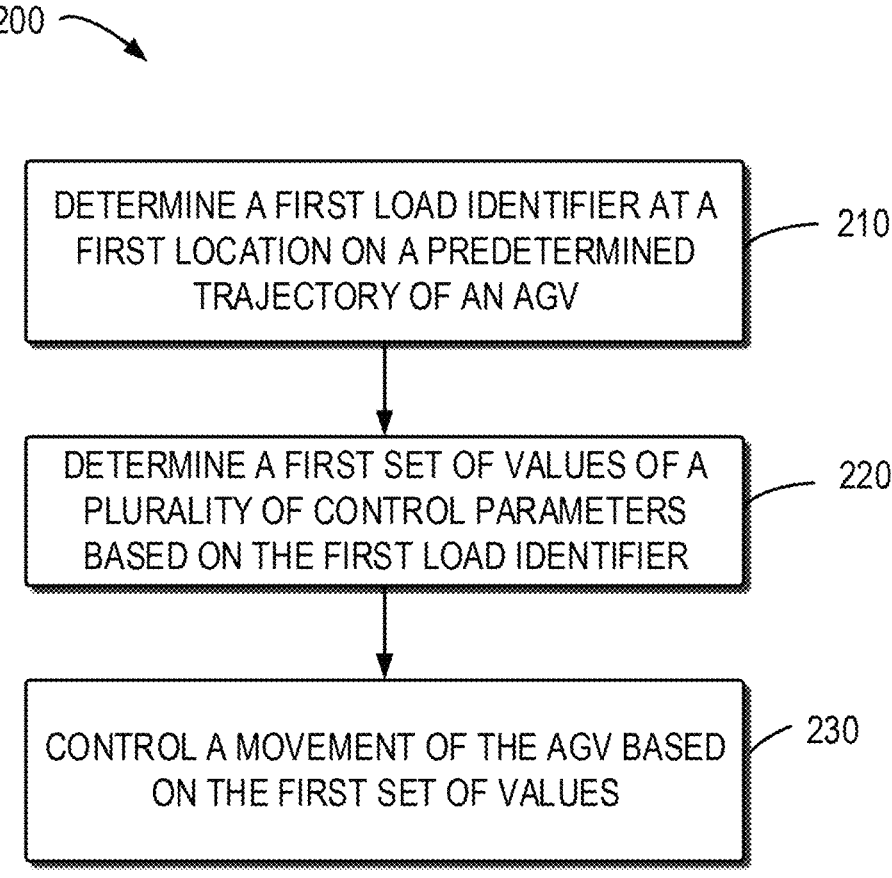
FIG. 2 illustrates a flowchart of a method for controlling a movement of the AGV in accordance with embodiments of the present disclosure.

FIG. 2 illustrates a flowchart of a method 200 for controlling an AGV in accordance with embodiments of the present disclosure. As shown in FIG. 2, at a block 210, a first load identifier (ID) is determined at a first location on the predetermined trajectory 120. The first load ID represents a first load condition at the first location. For example, at a starting point of the predetermined trajectory 120, a weight of a load to be carried by the AGV 110 from this starting point will be determined as the load condition at this starting point. Thus, a corresponding load ID will be determined based on the load condition.

In some example embodiments, the predetermined trajectory 120 may be divided into a plurality of segments based on a plurality of load conditions of the predetermined trajectory 120. Each segment is associated with a respective load identifier representing a respective load condition. For example, the AGV 110 may be configured to perform several tasks at different positions along the predetermined trajectory 120, such as raising or lowering the pin, adding or removing the loaded material or charging. Accordingly, the load condition such as the load weight will be different at different positions. The predetermined trajectory 120 thus can be divided into different segments according to the different load conditions at different positions.

Figure 3:
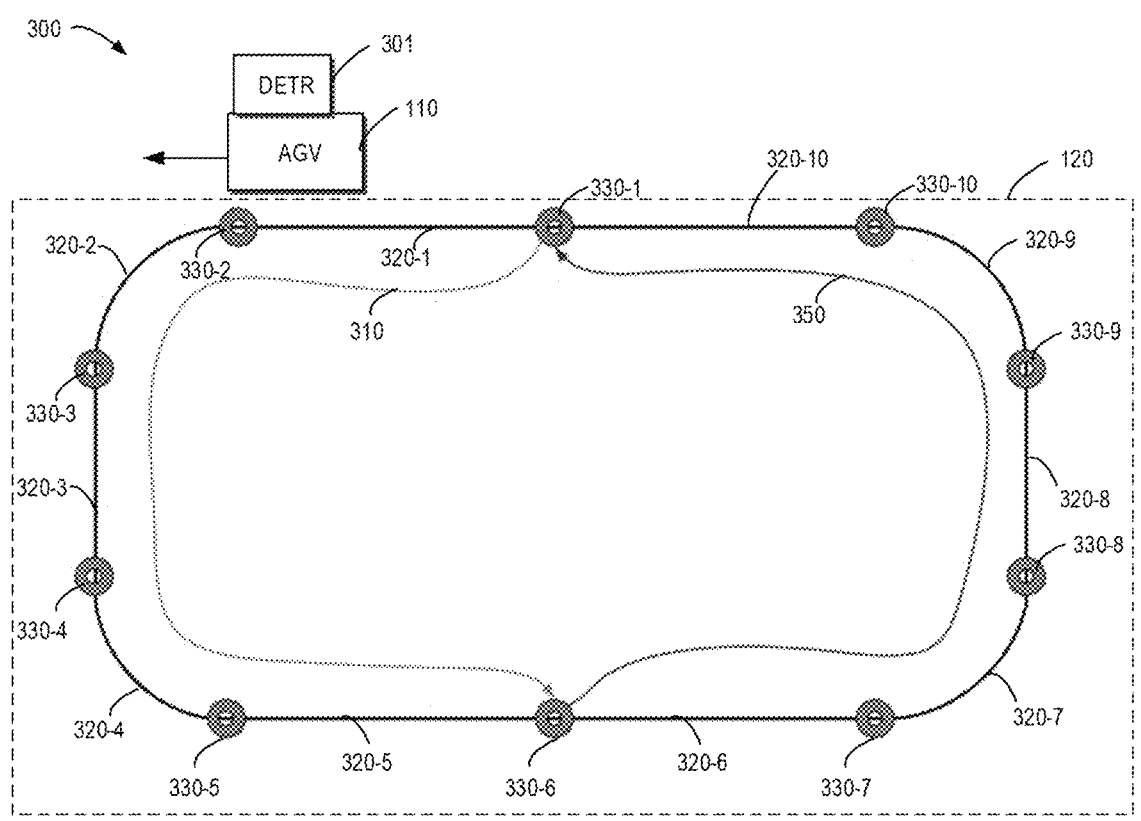
FIG. 3 illustrates example architecture in which the AGV travels along the predetermined trajectory in accordance with embodiments of the present disclosure.

FIG. 3 illustrates example architecture 300 in which the AGV 110 travels along the predetermined trajectory 120 in accordance with embodiments of the present disclosure. In the illustrated example, there are two tasks 310 and 350 along the predetermined trajectory 120. The task 310 is to transport the loaded material from a node 330-1 to a node 330-6, while the task 350 is to transport the loaded material from the node 330-6 to the node 330-1. The AGV 110 will travel in a direction illustrated by the arrow of the tasks 310 and 350. It is to be understood that the example tasks are shown for the purpose of illustration, without suggesting any limitations. There could be less or more tasks in the predetermined trajectory 120.

As illustrated in FIG. 3, the predetermined trajectory 120 is divided into several segments, including segment 320-1, segment 320-2, segment 320-3, segment 320-4, segment 320-5, segment 320-6, segment 320-7, segment 320-8, segment 320-9 and segment 320-10. Those segments may be collectively referred to as "segments 320" or individually referred to as a "segment 320". The term of "segment" or also referred to as "edge" used hereinafter refers to a segment of the predetermined trajectory with a respective load condition.

In the example of FIG. 3, the predetermined trajectory 120 is divided into those segments 320 by a plurality of nodes, including the nodes 330-1, 330-2, 330-3, 330-4, 330-5, 330-6, 330-7, 330-8, 330-9 and 330-10. Those nodes may be collectively referred to as "nodes 330" or individually referred to as a "node 330". As used herein, the term "node" may represent a position or a point along the predetermined trajectory 120, at which the load condition may change. In the architecture 300, all the nodes 330 and all the segments 320 constitute a map. It is to be understood that the example nodes and segments are shown for the purpose of illustration, without suggesting any limitations. The predetermined trajectory 120 or the map may contain less nodes and segments, or even more nodes and segments.

In some example embodiments, when the AGV 110 is located within each segment 320, a corresponding load ID will be determined. For example, if the AGV is located in the segment 320-1 as shown in FIG. 3, then the corresponding load ID may be determined based on the staring node 330-1 of the segment 320-1.

In some example embodiments, the load condition comprises at least one of: a weight of a load (such as a loaded material) carried by the AGV 110, a weight of a towing cart driven by the AGV 110, and a friction of wheels of the AGV 110. For example, in the case that the AGV 110 comprises a carrying AGV, the load condition may change when the load weight changes. For example, at node 330-1, initial material may be put on the AGV 110. For another example, at node 330-2, more material will be added on the AGV 110. For a further example, at node 330-4, some loaded material will be removed from the AGV 110. Thus, the load condition at the nodes 330-1, 330-2 and 330-4 may change.

Alternatively, or in addition, the load condition may change when the wheel friction changes. For example, during the segment 320-3 and from the node 330-3, the floor surface condition may change. That is, the load condition of the wheel friction will change at the node 330-3.

In some example embodiments, the AGV 110 may comprise a lurking and towing AGV, and thus the weight of the towing cart driven by the AGV 110 may influence the load condition. For example, at node 330-8, the AGV 110 may use a heavier towing cart to replace a lighter one. The load condition at this node 330-8 may be changed accordingly.

With these embodiments, it may consider various load conditions such as the load weight, the towing cart weight and the wheel friction. In this way, it may determine more adaptive values of control parameters based on the load conditions. Therefore, the accuracy of the movement trajectory of the AGV may be further increased effectively.

In the example of FIG. 3, the nodes 330 represent the position where the load condition changes. The plurality of segments 320 may be divided based on the nodes 330. Each segment 320 may be associated with a respective load identifier representing a respective load condition. Alternatively, or in addition, in some example embodiments, for each segment 320, a load ID marker is located at a starting point of the segment 320. The load ID marker may indicate a respective load ID of the segment. For example, at node 330-1 which is the starting point of the segment 320-1, a corresponding load ID marker is located. This load ID marker indicates a load ID representing the load condition along the segment 320-1. Likewise, at another node 330, another load ID marker indicating a respective load ID representing a respective load condition along a respective segment 320 will be located.

As shown in FIG. 3, a load ID marker detector 301 may be configured to be communicably coupled to the AGV 110. It is to be understood that the load ID marker detector 301 may also be integrated in the AGV 110. In some example embodiments, the load ID marker detector 301 may detect the load ID marker and then transmit an indication signal to the AGV 110 indicating the detected load ID marker. In response to receive the indication signal indicating the detected load ID marker, a corresponding load identifier may be determined based on the detected load ID marker.

With these embodiments, different segments can be marked with different load identifiers at the starting point of each segment. Thus, it can switch the values of control parameters at the starting point of each segment. Compared with a regular way for controlling the AGV based on fixed values of the control parameters along the whole trajectory, the values of the control parameters can be adjusted according to different load identifiers in different segments of the trajectory. Therefore, the accuracy of the movement trajectory of the AGV may be further increased effectively.

In some example embodiments, the load ID marker comprises a radio frequency identification (RFID) tagger. In this case, the load ID marker detector 301 may comprise a RFID tagger reader. In addition, the AGV 110 may further store a set of RFID taggers and the corresponding load IDs in the memory of the AGV 110. When the RFID tagger reader detects a certain RFID tagger, it may compare the certain RFID tagger with the stored RFID taggers. If the certain RFID tagger matches with a stored RFID tagger, a corresponding load ID may be determined accordingly.

Alternatively, or in addition, the load ID marker may comprise a Quick Response (QR) code. In this case, the load ID marker detector 301 may comprise a QR code reader. Likewise, a set of QR codes and corresponding load IDs may be stored in the memory of the AGV. If a detected QR code matches with a stored QR code, a corresponding load ID may be determined accordingly.

With these embodiments, the RFID tagger or the QR code may be used as the load identifier marker. The RFID tagger and the QR code are easy to be generated with a smaller size and a high precision. Therefore, the RFID tagger and the QR code may facilitate the movement control in an easy and effective way.

Alternatively, or in addition, in some example embodiments, a weight sensor may be communicably coupled to the AGV 110. If the weight sensor detects that the weight of the loaded material changes, it may transmit the changed weight to the AGV 110. The AGV 110 may further store a mapping between the weights and the corresponding load IDs. The AGV 110 may determine a corresponding load ID based on the changed weight and according to the mapping.

In some example embodiments, the detector 301 and the weight sensor can be used in combination. The AGV 110 may store a group of load IDs with its corresponding RFID tagger (or QR code) and the corresponding weight. For example, at a certain position with a certain RFID tagger, if the weight of the loaded material is less than a threshold weight, then the load ID will be a first load ID in the group of load IDs. If the weight of the loaded material exceeds the threshold weight, then the load ID will be a second load ID in the group of load IDs. By combining the detector 301 with the weight sensor, it can adapt to the situation where the weight of the loaded material may change at a same position.

Still refer to FIG. 2. At block 220, a first set of values of a plurality of control parameters is determined based on the first load ID determined at block 210. For example, a corresponding load condition may be determined based on the first load ID. Thus, the first set of values can be determined based on the corresponding load condition. In the example illustrated in FIG. 3, when the AGV 110 is located within the segment 320-1, the corresponding load ID may be determined based on the staring node 330-1 of the segment 320-1. A corresponding load condition may be determined based on this load ID of node 330-1. A corresponding set of values will be determined based on this load condition.

In some example embodiments, the set of values can be predetermined before applying the AGV 110 to perform a certain task. A mapping between different sets of control parameter values and the corresponding load IDs will be stored by the AGV 110. When the AGV 110 performs a certain task, the AGV 110 may be controlled based on the predetermined control parameter values associated with a corresponding load ID by the controlling component 130. Details regarding how to predetermine the control parameter values will be described with respect to FIG. 6 below.

In some example embodiments, the controlling component 130 comprises a proportional derivative (PD) controller or a PID controller. That is, the plurality of control parameters comprises: a proportional gain, a derivation time, and an optional integral time. In this case, a plurality of candidate sets of values of the proportional gain, the derivation time and the optional integral time may be predetermined or preconfigured. For example, each candidate set of values may be predetermined based on a corresponding load condition. Each candidate set of values may be mapped to the corresponding load ID associated with the corresponding load condition. Accordingly, the first set of values may be determined based on the mapping of the candidate sets of values and the load IDs.

Alternatively, or in additional, the controlling component 130 may comprise other suitable kinds of controller, which will be described in details below. In some example embodiments, each candidate set of values may be predetermined based on the corresponding load condition and an estimated transfer function of the AGV 110, which will also be described in details below.

At block 230, a movement of the AGV 110 is controlled based on the first set of values determined at block 220. In the example illustrated in FIG. 3, when the AGV 110 is located within the segment 320-1, the corresponding load ID may be determined based on the staring node 330-1 of the segment 320-1. A corresponding set of values will be determined based on the corresponding load ID of node 330-1. It may thus apply the determined set of values to control the movement of the AGV 110 in the segment 320-1. For example, the controlling component 130 may use the determined set of values to control the movement of the AGV 110.

With these embodiments, the movement of the AGV along each segment of the predetermined trajectory can be controlled based on respective load identifier. Therefore, the accuracy of the movement trajectory of the AGV may be further increased effectively.

In some example embodiments, the controlling component 130 may comprise a PD controller or a PID controller with values determined at block 220. It is to be understood that the controlling component 130 may comprise any suitable kinds of controller.

Figure 4:
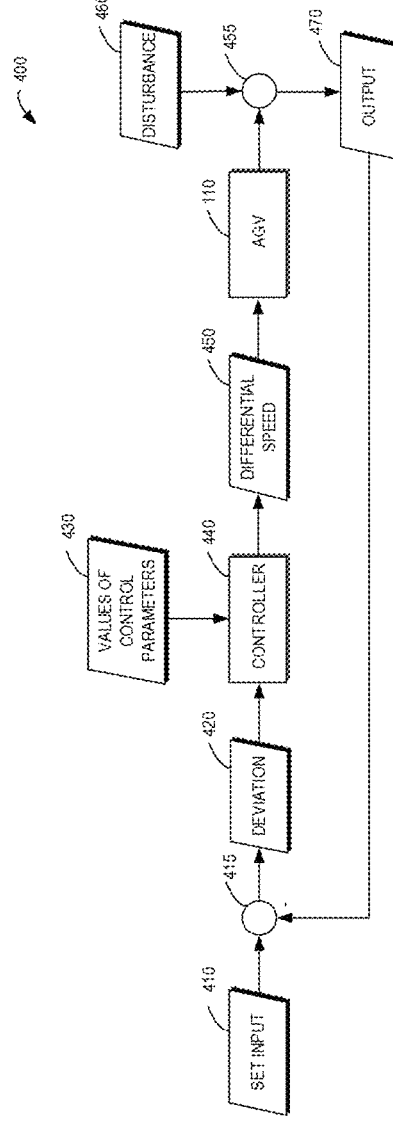
FIG. 4 illustrates a block diagram of example architecture for controlling the movement of the AGV in accordance with embodiments of the present disclosure.

FIG. 4 illustrates a block diagram of example architecture 400 for controlling the movement of the AGV in accordance with embodiments of the present disclosure. As illustrated in FIG. 4, a set input 410 may be inputted to a subtractor 415. For example, the set input 410 represents a sequence of values of the center of the magnetic tapes along the predetermined trajectory 120. An output 470 may be inputted to the subtractor 415. The output 470 represents a sequence of actual positions or current positions of the AGV 110 along the predetermined trajectory 120. When controlling the AGV 110, a controlled position of the AGV 110 may be influenced by a disturbance 460 such as a ground disturbance. That is, the output 470 may be represented as summing the controlled position with the disturbance 460 by a summator 455. It is to be understood that in some example embodiments the disturbance 460 may be ignored.

In the example as shown in FIG. 4, a deviation 420 may be represented by subtracting the output 470 from the set input 410 by the subtractor 415. The deviation 420 may represent a sequence of current position deviations of the AGV 110 in relative to the predetermine trajectory 120. In some example embodiments, the current position of the AGV 110 may be detected by a position sensor. The deviation 420 may be determined based on the detected current position(s) and the set input 410.

Alternatively, or in addition, the deviation 420 may be determined by a position sensor. For example, a magnetic sensor may be used to detect the current position of the AGV 110 in relative to the magnetic tape. That is, the magnetic sensor may be used to determine the deviation 420. In the example of using the SLAM for localization, it may use a laser scanner as the position sensor to detect the deviation 420. In the example of using the VSLAM for localization, it may use a camera to detect the deviation 420. It is to be understood that these example position sensors are only for the purpose of illustration, without suggesting any limitations. Any other suitable sensor can be used to determine the current position of the AGV 110 or to determine the deviation 420.

In some example embodiments, a controller 440 comprised in the controlling component 130 may receive the deviation 420 and the values of control parameters 430 determined based on the load ID. For example, the values of control parameters 430 may comprise the first set of values. The controller 440 may determine a differential speed 450 based on the deviation 420 and the first set of values.

In some example embodiments, a left speed for a left wheel (or a left motor) and a right speed for a right wheel (or a right motor) of the AGV 110 may be determined based on the differential speed 450. For example, the AGV 110 may be configured with a center speed. The left speed may be determined by adding the differential speed 450 with the center speed, while the right speed may be determined by subtracting the differential speed 450 from the center speed. Alternatively, the left speed may be determined by subtracting the differential speed 450 from the center speed, while the right speed may be determined by adding the differential speed 450 with the center speed. It is to be understood that the left and right speeds can be adjusted based on the differential speed 450 by using other suitable methods. The AGV 110 may subsequently travel with the adjusted left and right speeds in order to return to the predetermined trajectory 120.

With these embodiments, it may determine the wheel speeds of the AGV based on the deviation in relative to the predetermined trajectory and the values of control parameters according to the respective load condition. Therefore, the accuracy of the movement trajectory of the AGV may be further increased effectively.

In some example embodiments, the controller 440 may comprise a PD controller. In this case, the plurality of control parameters may comprise a proportional gain and a derivation time. Alternatively, or in addition, the controller 440 may comprise a PID controller. In this case, the plurality of control parameters may comprise a proportional gain, an integration time and a derivation time. It is to be understood that the controlling component 130 may use any other suitable controller. With these embodiments, it may apply a PID control or an improved PID control to control the movement of the AGV along each segment. In this way, it may have the advantages of simple structure, easy implementation and good robustness.

Figure 5:
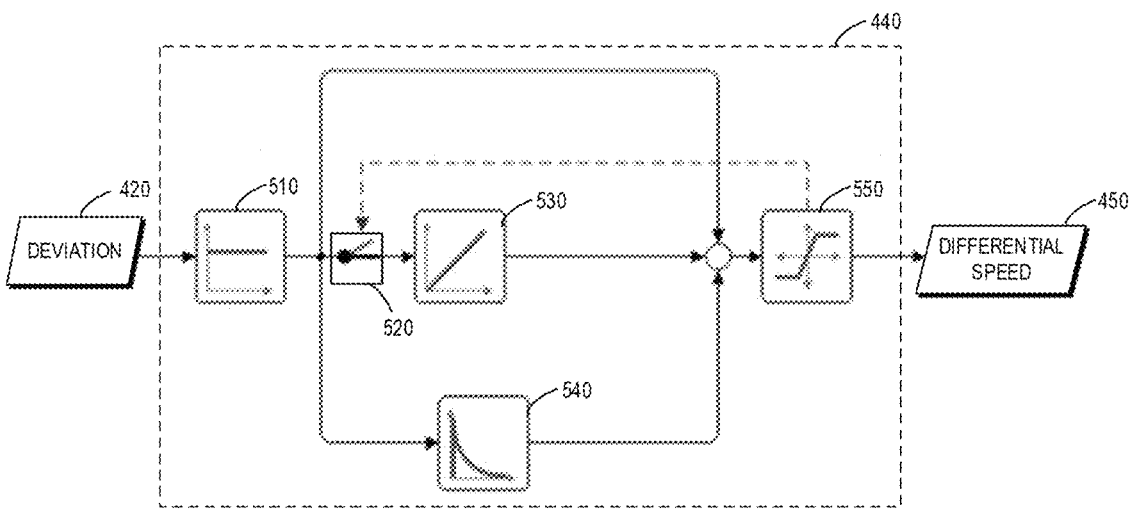
FIG. 5 illustrates a block diagram of example controller of the AGV in accordance with embodiments of the present disclosure.

FIG. 5 illustrates a block diagram of example controller 440 of the AGV 110 in accordance with embodiments of the present disclosure. The controller 440 in FIG. 5 is an improved PID controller. As illustrated in FIG. 5, the controller 440 may receive the deviation 420 and output the differential speed 450.

In the example as shown in FIG. 5, the controller 440 comprises a proportional part 510, an integral part 530 and a derivative part 540. The proportional part 510 may be configured with a proportional gain. The integral part 530 may be configured with an integration time. The derivative part 540 may be configured with a derivation time. Additionally, the controller 440 further comprises a switch 520. The switch 520 may be configured with a threshold limit for the integral part 530. If the output of the proportional part 510 is below the threshold limit, then the switch 520 will be closed. If the output of the proportional part 510 exceeds the threshold limit, then the switch 520 will open and the integral part 530 will stop integration accordingly. Introducing the switch 520 may be helpful in achieving anti-windup.

In addition, as shown in FIG. 5, the controller 440 further comprises a first-order filter 550. The first-order filter may be configured with a filter time. That is, in the example of FIG. 5, the plurality of control parameters comprises: the proportional gain for the proportional part 510, the integration time for the integral part 530, the derivation time for the derivative part 540, and the filter time for the first-order filter 550. By introducing the control parameter of the filter time, high-frequency interference may be suppressed.

The controller 440 described with respect to FIG. 5 has a simple structure and is easy to implement. By using such controller 440, it can ensure that the deviation of the AGV 110 may be eliminated in a short time, and the AGV 110 may travel along the predetermined trajectory fast and steadily.

Thus it can ensure a satisfying tracking performance of the AGV 110 under different load conditions.

Examples of controller 440 and examples of the plurality of control parameters have been described with respect to FIG. 5. In this example, the transfer function of the controller 440 may be described as a sum of the proportional part 510, the integral part 530, the derivative part 540 and the first-order filter 550, which is expressed as below:

$$G(s) = K_p \cdot \left( 1 + \frac{1}{T_i s} + \frac{T_d s}{1 + T_f s} \right) \tag{1}$$

wherein G(s) represents the transfer function of the controller 440, $K_p$ denotes the proportional gain, $T_i$ denotes the integration time, Ta denotes the derivative time, and $T_f$ denotes the filter time.

In some example embodiments, data type of these control parameters may be created. Table 1 below shows an example data type for these control parameters. In this example the control parameters may be of "real" data type. It is to be understood that Table 1 is only for the purpose of illustration, without suggesting any limitations. The plurality of control parameters may use other suitable data type. These four control parameters may use the same data type or different data types.

TABLE 1

| Parameter Name | Data Type | Description |
|---|---|---|
| | Parameters Type | |
| Proportional gain | REAL | Proportional gain |
| Integration time | REAL | Integration time constant |
| Derivative time | REAL | Derivative time constant |
| Filter time | REAL | Time constant of the first-order filter |

In some example embodiments, a plurality of candidate sets of values of the plurality of control parameters may be determined based on a plurality of load conditions and the estimated transfer function of the AGV 110. Each candidate set of values is associated with a respective load ID. The respective load ID represents a respective load condition. Table 2 shows an example array variable with the data type in Table 1.

TABLE 2

| Variable Name | Data Type |
|---|---|
| PidParameters | PIDParameters Type[0 . . . 8] |
| PidParameters[0] | PIDParametersType |
| Proportional gain | Real |
| Integration time | Real |
| Derivative time | Real |
| Filter time | Real |
| PidParameters[1] | PIDParametersType |
| Proportional gain | Real |
| Integration time | Real |
| Derivative time | Real |
| Filter time | Real |
| . . . | . . . |
| . . . | . . . |

TABLE 2-continued

| Variable Name | Data Type |
|---|---|
| PidParameters[8] | PIDParametersType |
| Proportional gain | Real |
| Integration time | Real |
| Derivative time | Real |
| Filter time | Real |

In Table 2, there are nine sets of candidate sets of values, that is, PidParameters[0], PidParameters[1], . . . , and PidParameters[8]. Each candidate set of values comprises a value for the proportional gain, a value for the integration time, a value for the derivative time and a value for the filter time. These nine sets of candidate sets of values may be predetermined or preconfigured. Each candidate set of values may be associated with a corresponding load ID. For example, a mapping between the PidParameters and the load ID may be stored.

Table 3 below illustrates an example mapping between the PidParameters (also referred to as the control parameter sets element) and the load ID. As shown in Table 3, the load ID may be used as the index for the set of values of control parameters. The load ID may be used to refer to the corresponding control parameter sets element in Table 3.

TABLE 3

| Load ID | Control Parameter Sets Element | Description |
|---|---|---|
| Load ID 0 | PidParameters[0] | Values for the AGV with no load |
| Load ID 1 | PidParameters[1] | Values for the AGV with load ID 1 |
| Load ID 2 | PidParameters[2] | Values for the AGV with load ID 2 |
| Load ID 3 | PidParameters[3] | Values for the AGV with load ID 3 |
| Load ID 4 | PidParameters[4] | Values for the AGV with load ID 4 |
| Load ID 5 | PidParameters[5] | Values for the AGV with load ID 5 |
| Load ID 6 | PidParameters[6] | Values for the AGV with load ID 6 |
| Load ID 7 | PidParameters[7] | Values for the AGV with load ID 7 |
| Load ID 8 | PidParameters[8] | Values for the AGV with load ID 8 |

In some example embodiments, a set of values associated with the first load ID may be selected from the plurality of candidate sets of values as the first set of values. For example, the segment 330-1 in FIG. 3 may be configured with the load ID 1. Thus, a corresponding set of values, i.e., PidParameters[1] may be selected as the set of values being applied by the controller 440 along the segment 330-1.

With these embodiments, it may predetermine a plurality of candidate sets of values for the plurality of control parameters through self-tuning of control parameters. In this way, it may greatly reduce the debugging time when controlling the AGV.

In some example embodiments, for each load ID, the candidate set of values may be adjusted separately. For example, the candidate set of values may be determined based on the corresponding load condition and the estimated transfer function of the AGV 110.

In some example embodiments, an open-loop transfer function of the AGV 110 may be estimated. For example, it may use the system identification function in MATLAB/Simulink to estimate the open-loop transfer function of the AGV 110. The step response data of the estimated open-loop transfer function of the AGV 110 may be determined under the corresponding load condition associated with each load ID. Furthermore, a PID Tuner tool in MATLAB/Simulink may be used to obtain the auto-tuning PID parameters under the corresponding load ID. By using the PID Tuner tool, the auto-tuned values of control parameters can achieve better control effect in actual field application. Moreover, it may also reduce the time for tuning the control parameters when controlling the movement of the AGV 110. In addition, compared with a regular way for controlling the AGV using adjustable control parameters such as using fuzzy proportional-integral-derivative (PID) control, the application may shield the complexity of the control algorithm from the user. Thus, it may provide a convenience way for the AGV movement control.

FIG. 6 illustrates a flowchart of a method 600 for determining values of the control parameters based on the load ID in accordance with embodiments of the present disclosure. In the example of FIG. 6, it takes the load ID 0 as an example, which means the AGV 110 has no load. Details regarding how to determine the values under load ID 0 may be described as follows.

At block 610, a standstill position for the AGV 110 may be determined. In this example, the AGV 110 is unloaded and drives into a certain straight path of the magnetic tape along the predetermined trajectory 120. Observe the actual deviation value from the center of the magnetic tape and the pose of the AGV 110. When the deviation value is smaller than a predefined threshold value and the pose of the AGV 110 is roughly parallel to the straight path, determine the current position as the standstill position. At this standstill position, stop the AGV 110 and keep the AGV 110 standstill.

At block 620, input-output data (for example an input-output curve) is obtained using a preset differential speed. For example, the preset differential speed may comprise a left motor speed 10 mm/s, and a right motor speed 20 mm/s. This preset speed may be suddenly given to the AGV 110 while the AGV 110 is stopping at the standstill position. The deviation value from the center of magnetic tape will be obtained and recorded. The input-output data will be obtained, where the input comprises the sequence of center of the magnetic tape, while the output comprises the sequence of the deviation value. In some example embodiments, the input-output data may be imported into MATLAB Workspace. The above mentioned left and right motor speeds are only for the purpose of illustration, without suggesting any limitations. It can use other suitable left and right motor speeds.

At block 630, an open-loop transfer function may be determined based on the input-output data. For example, it may use the system identification toolbox in MATLAB to determine the open-loop transfer function. The input and output data will be imported in the word area and be divided into two parts respectively: the training part and the verification part. Choosing to estimate the transfer function in the system identification toolbox and setting the appropriate zero and pole numbers, thus the open-loop transfer function will be obtained. For example, the number of poles can be configured as 2 while the number of zeros can be configured as 0 in this case.

At block 640, a simulation model is created using the open-loop transfer function and preset values of control parameters. For example, the simulation model may be established in SIMULINK. The simulation model may comprise a PID controller model with randomly generated values of the control parameters and a further model with the open-loop transfer function.

At block 650, the values of control parameters are tuned to obtain a satisfying response. In the case of using SIMULINK to create the simulation model, the values of control parameters may be automatically tuned by using "PID TUNER APP" in SIMULINK. For example, double click the PID controller model in the simulation model to open the PID controller configuration interface. Click the "Tune" button in the PID controller configuration interface, thus the values of control parameters may be automatically fine-tuned.

At block 660, the values of control parameters are obtained. For example, in the case of using the "PID TUNER APP" in SIMULINK, the values of control parameters may be obtained by clicking "Show Parameters" button in this toolbox. Alternatively, or in addition, if the response of the tuned values of control parameters is not satisfying, it may repeat the block 650 until a satisfying response is obtained. With the satisfying response, it may use the "Show Parameters" button to show the fine-tuned values of control parameters.

In the example of using SIMULINK to determine the values of control parameters, the values of control parameters of the PID controller in SIMULINK need to be converted into the values of control parameters for the controller 440. The transfer function of the PID controller in SIMULINK is show as follows:

$$P\left(1 + I\frac{1}{s} + D\frac{N}{1 + N\frac{1}{s}}\right) \tag{2}$$

In (2), P, I, D and N respectively denotes the proportional parameter, the integral parameter, the derivative parameter and the filter parameter.

Recalling the transfer function expressed in (1), the relationship between the two expressions can be obtained as: $K_p$=P, $T_i$=1/I, $T_d$=D, $T_f$=1/N. Based on the values obtained from the SIMULINK and the above relationship between the two expressions, the values of control parameters of the controller 440 may be obtained.

Figure 7:
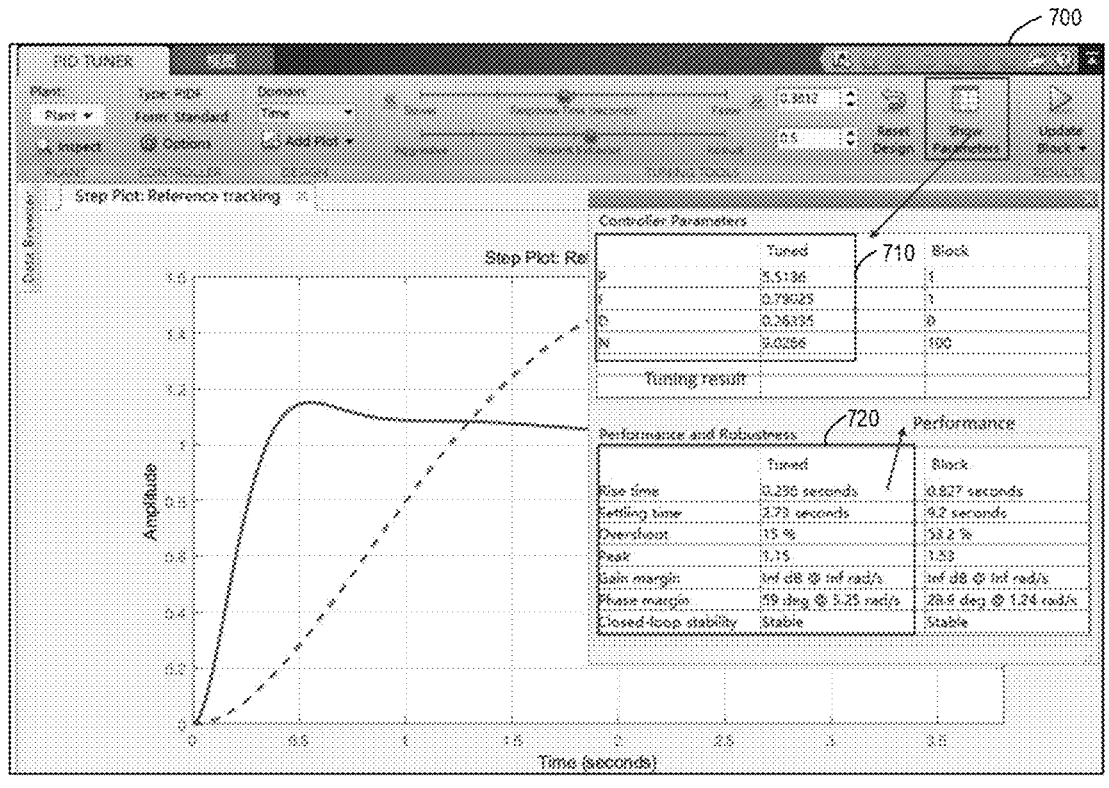
FIG. 7 illustrates an example display of fine-tuned values of control parameters in accordance with embodiments of the present disclosure.

FIG. 7 illustrates an example display 700 of fine-tuned values of control parameters in accordance with embodiments of the present disclosure. As shown in FIG. 7, values of controller parameters 710 comprises P=5.5136, I=0.79025, D=0.26335 and N=9.0266. Taking the values of controller parameters 710 as an example, the values of control parameters PidParameters[0] corresponding to load ID 0 comprise $K_p$=5.5136, $T_i$=1.26, $T_d$=0.26335, $T_f$=0.1107.

The performance 720 of the simulation model is also illustrated in FIG. 7. For example, the performance 720 may comprise a rise time, a setting time, an overshoot, a peak and other performance values. The user may determine whether the fine-tuned values 710 are satisfying based on the performance 710. If not satisfying, the user may choose to repeat performing the fine-tuning process until obtaining a satisfying performance 720.

Details regarding determination of the values of control parameters with load ID 0 have been described with respect to FIGS. 6-7. Likewise, values of control parameters with other load ID may be determined by using similar methods. It is to be understood that the MATLAB based example methods of determination of control parameter values are only for the purpose of illustration, without suggesting any limitations. It could also use other suitable method to determine the control parameter values.

With these embodiments, it may predetermine a plurality of candidate sets of values of control parameters corresponding to different load ID through self-tuning of control parameters. Thus, it may apply a PID controller or an improved PID controller with fine-tuned control parameters to control the movement of the AGV along each segment. In this way, it may greatly reduce the debugging time when controlling the AGV.

In addition, in the case of using the improved PID controller with the filter time parameter, not only the proportional gain, the integral time and the derivative time may be adjusted, but also the filter time may be adjusted according to the load condition. In this way, it may greatly suppress the high-frequency interference.

In some example embodiments, the values of control parameters may be determined automatically based on the load ID. Alternatively, or in addition, the values of control parameters may be determined manually. For example, a qualified user such as the commission engineer may input a trigger indicating a second load ID different from the current load ID via a user interface or via an input component. In response to receiving the trigger indicating the second load ID, a second set of values of control parameters may be determined based on a corresponding load condition associated with the second load ID. The movement of the AGV 110 may be controlled based on the second set of values accordingly.

With these embodiments, the user may forcibly activate a certain load ID under special circumstances by inputting a trigger indicating this load ID. In this way, the values of control parameters under such manual selected load ID can be immediately applied in the controller. In this way, the AGV can be controlled both automatically and manually. In addition, this kind of manual control will be suitable for controlling the AGV in emergency situations or in failure process.

Figure 8:
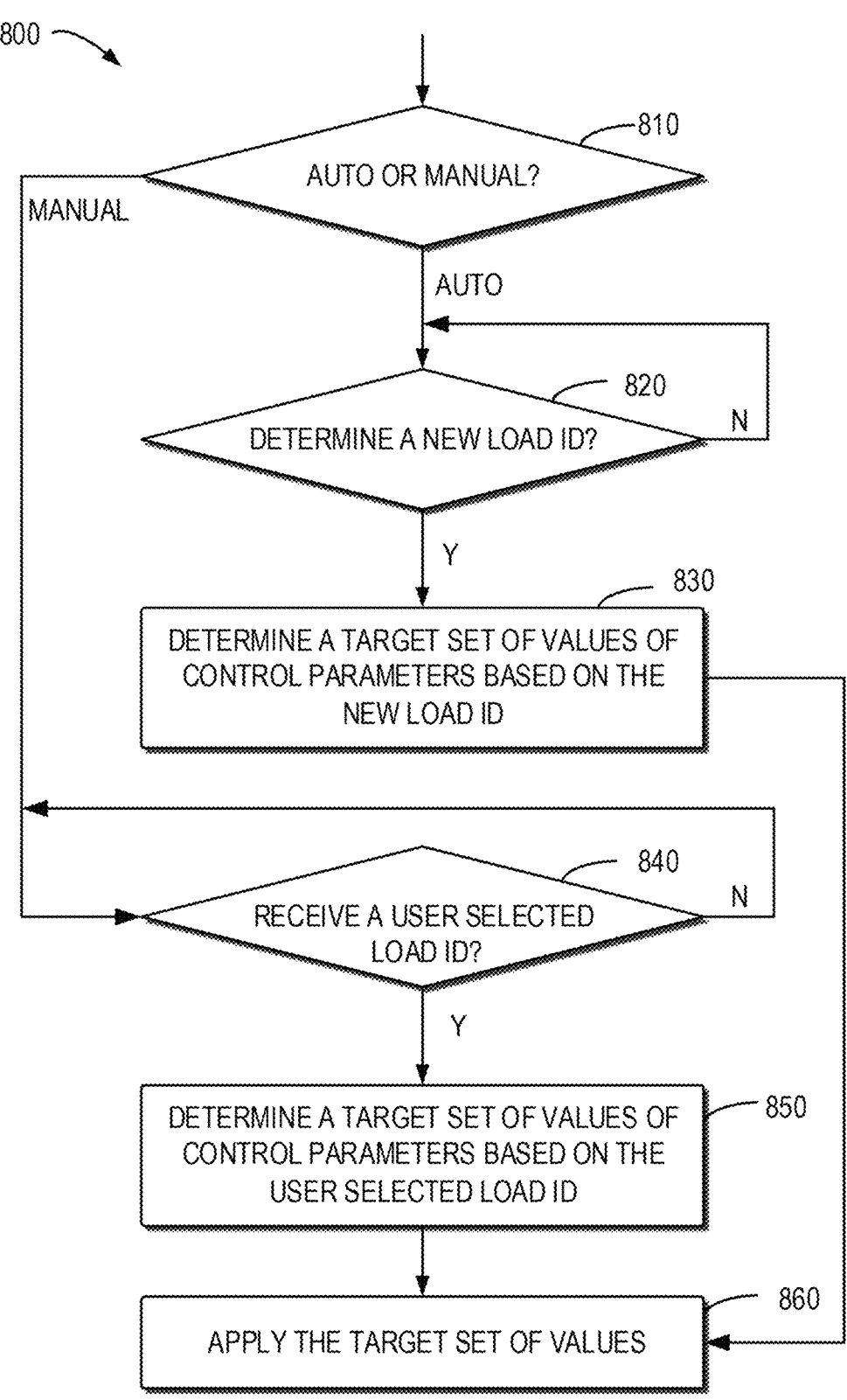
FIG. 8 illustrates a flowchart of a method for automatically or manually applying values of the control parameters in accordance with embodiments of the present disclosure.

FIG. 8 illustrates a flowchart of a method 800 for automatically or manually applying values of the control parameters in accordance with embodiments of the present disclosure. At block 810, it determines whether to perform the automatic mode or the manual mode. For example, the user may select the automatic/manual mode from the user interface. Alternatively, or in addition, the default mode may be configured as the automatic mode. It may change to the manual mode in responsive to the trigger inputted by the user.

If it determines to perform the automatic mode at block 810, the method 800 may proceed to block 820. At block 820, it determines whether there is a new load ID. For example, it may determine whether the detector 301 detects a new load ID. If no new load ID is detected, then the method 800 will continue to proceed the block 820. If the new load ID is detected, then the method 800 may proceed to block 830.

Alternatively, or in addition, in some example embodiments, it may determine whether there is a new load ID by determining whether a weight of the loaded material changes. In this case, a weight sensor may be communicably coupled to the AGV 110. If the weight sensor detects that the weight of the loaded material changes, it may transmit the changed weight to the AGV 110. The AGV 110 may determine a corresponding new load ID based on the changed weight, then the method 800 may proceed to block 830. If the weight of the loaded material remains the same, then no new load ID is determined, then the method 800 will continue to proceed the block 820.

At block 830, it determines a target set of values of control parameters based on the new load ID. For example, it may determine the target set of values based on the mapping between the sets of values and the load IDs, for example the mapping shown in Table 3. At block 860, the target set of values may be applied. For example, the target set of values may be applied to the controller 440 to control the movement of the AGV 110 in real time.

If it determines to perform the manual mode at block 810, the method 800 may proceed to block 840. At block 840, it determines whether a user selected load ID is received. For example, it may determine whether a user selected load ID is received via the user interface. If no user selected load ID is received, the method 800 may continue to perform the block 840. If a user selected load ID is received at block 840, the method 800 may proceed to block 850. At block 850, a target set of values of control parameters may be determined based on the user selected load ID. Likewise, the target set of values may be determined based on the mapping between the sets of values and the load IDs. At block 860, the target set of values may be applied. For example, the target set of values may be applied to the controller 440 to control the movement of the AGV 110 in real time.

By using the method 800, it can activate the corresponding load ID in automatic/manual mode. In this way, the corresponding control parameter values can be updated to the controller in real time.

Figure 9A:
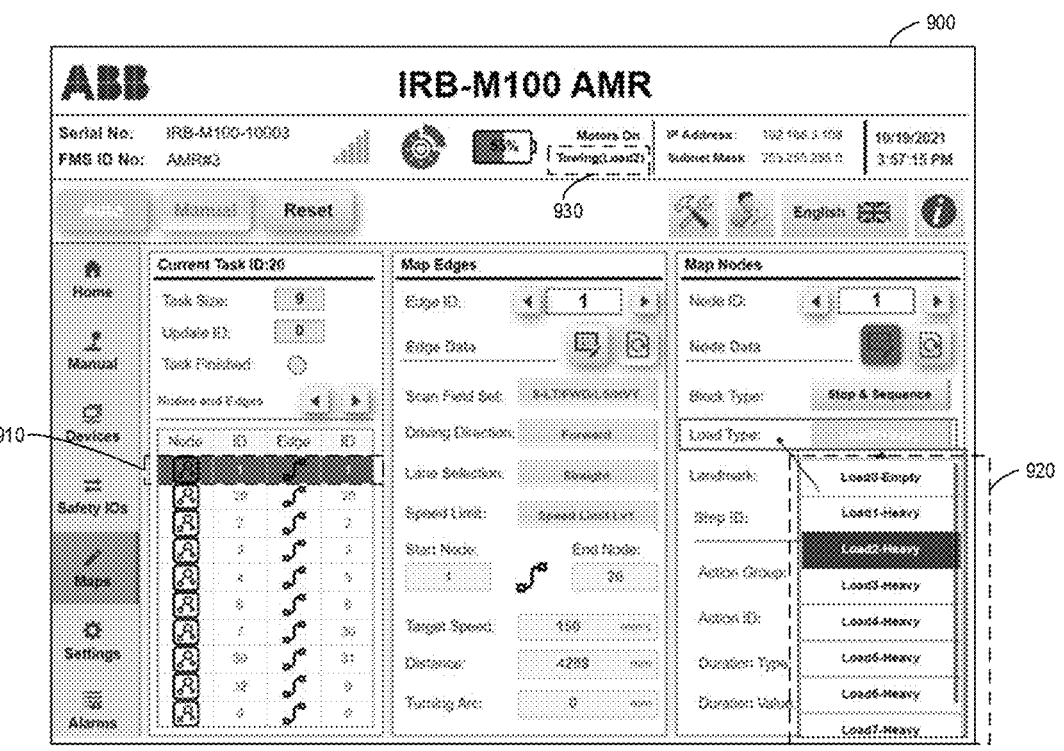
FIGS. 9A and 9B illustrate example user interfaces in accordance with embodiments of the present disclosure.

FIG. 9A illustrates an example user interface 900 in accordance with embodiments of the present disclosure. In FIG. 9A, it performs the automatic determination of values of control parameters. The block 910 shows that the AGV 110 is traveling on the edge with edge ID 1 and passed by the node with node ID 1. Each node shown in FIG. 9A has a configurable load ID. It allows the qualified user to select a suitable load ID according to the load condition or the scene of the given node under the process flow. The block 920 shows that the current load ID is "Load2-Heavy" or also be referred to as "load ID 2" or "Load2". The block 930 illustrates that the AGV 110 comprises a lurking and towing AGV and the current load ID is "Load2". The block 930 may be displayed in an eye-catching position of the user interface 900, to indicate that the control parameter values corresponding to this load IDF have been applied to the controller. In this situation, a set of values of control parameters corresponding to the load ID 2 will be automatically determined and applied to the controller for real-time adjustment of the movement of the AGV 110. For example, the load ID in block 930 may be used to refer to the elements in the corresponding control parameter array as shown in Table 3.

Figure 9B:
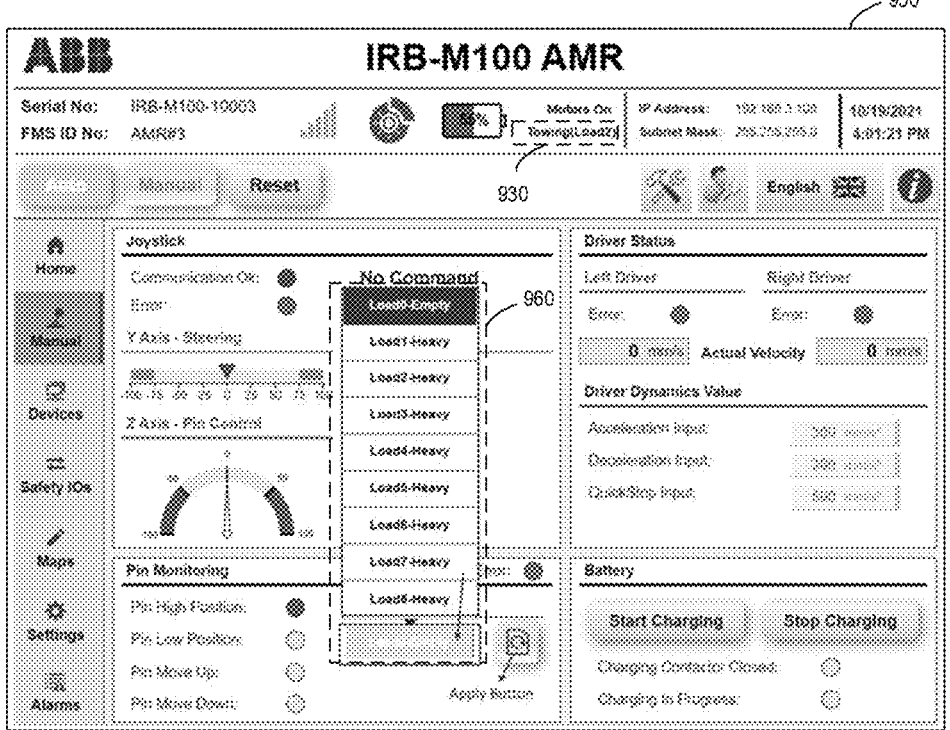

FIG. 9B illustrates another example user interface 950 in accordance with embodiments of the present disclosure. In FIG. 9B, it performs the manual determination of values of control parameters. As illustrated in block 930, the AGV is the lurking and towing AGV and the current load ID is "Load2". In this case, the user may select the manual determination model via the user interface 950. The user may further select a load ID from candidate load IDs in block 960. The user may further click the "Apply Button" and apply the values of control parameters corresponding to the selected load ID to control the movement of the AGV 110.

Figure 10:
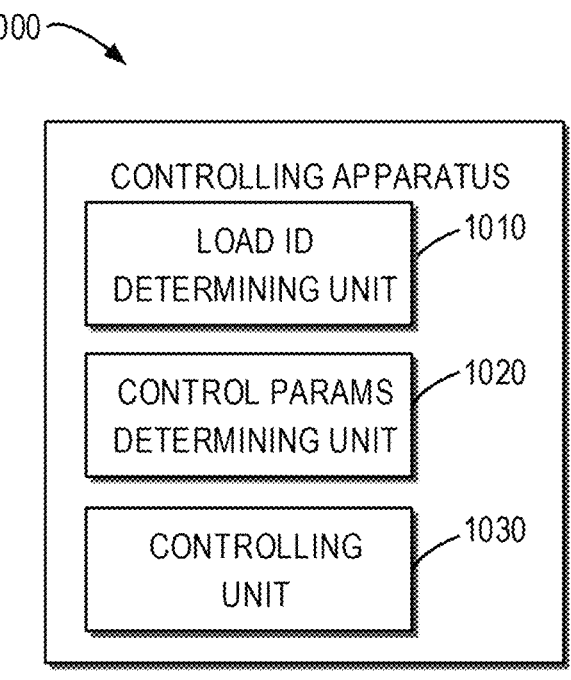
FIG. 10 illustrates a schematic diagram of an apparatus for controlling an AGV in accordance with embodiments of the present disclosure.

The preceding paragraphs having described detailed steps of the method 200, in some embodiments of the present disclosure, the method 200 may be implemented by corresponding apparatus. FIG. 10 illustrates a schematic diagram of a movement control apparatus 1000 for controlling an AGV in accordance with embodiments of the present disclosure. As illustrated in FIG. 10, the apparatus 1000 is for controlling the AGV 110. The apparatus 1000 comprises: a load identifier determining unit 1010 for determining a first load identifier at a first location on a predetermined trajectory of the AGV. The first load identifier represents a first load condition at the first location. The apparatus 1000 further comprises: a control parameter determining unit 1020 for determining a first set of values of a plurality of control parameters based on the first load identifier; and a controlling unit 1030 for controlling a movement of the AGV based on the first set of values.

In some embodiments, the apparatus 1000 further comprises: a trajectory segment determining unit for determining, based on a plurality of load conditions of the predetermined trajectory, a plurality of segments of the predetermined trajectory, each segment being associated with a respective load identifier representing a respective load condition.

In some embodiments, for each segment of the plurality of segments, a load identifier marker is located at a starting point of the given segment, the load identifier marker indicating a respective load identifier of the given segment; and the load identifier determining unit 1010 comprises: a first load identifier determining unit for determining the first load identifier based on a detected load identifier marker in response to detect a load identifier marker by a detector at the first location.

In some embodiments, the load identifier marker comprises one of: a radio frequency identification (RFID) tagger, or a Quick Response (QR) code; and wherein the detector comprises one of: a RFID tagger reader, or a QR code reader In some embodiments, the controlling unit 1030 comprises: a movement controlling unit for in accordance with a determination that the AGV is located in a first segment associated with the first load identifier, controlling the movement of the AGV based on the first set of values.

In some embodiments, the controlling unit 1030 comprises: a deviation determining unit for determining, by a position sensor, a current position deviation of the AGV in relative to the predetermined trajectory; a differential speed determining unit for determining a differential speed based on the current position deviation and the first set of values; and a speed determining unit for determining a left speed and a right speed for a left wheel and a right wheel of the AGV based on the differential speed.

In some embodiments, the plurality of control parameters comprise: a proportional gain, an integration time, and a derivation time, or the plurality of control parameters comprise: a proportional gain, an integration time, a derivation time, and a filter time.

In some embodiments, the apparatus 1000 further comprises: a candidate value determining unit for determining a plurality of candidate sets of values of the plurality of control parameters based on a plurality of load conditions and an estimated transfer function of the AGV, each candidate set of values being associated with a respective load identifier representing a respective load condition; and the control parameter determining unit 1020 comprises: a selecting unit for selecting, from the plurality of candidate sets of values, a set of values associated with the first load identifier as the first set of values.

In some embodiments, the apparatus 1000 further comprises: a receiving unit for receiving a trigger indicating a second load identifier different from the first load identifier; and a further controlling unit for controlling the movement of the AGV based on a second set of values of the plurality of control parameters corresponding to the second load identifier, the second set of values being different from the first set of values.

In some embodiments, the first load condition comprises at least one of: a weight of a load carried by the AGV, a weight of a towing cart driven by the AGV, and a friction of wheels of the AGV.

Figure 11:
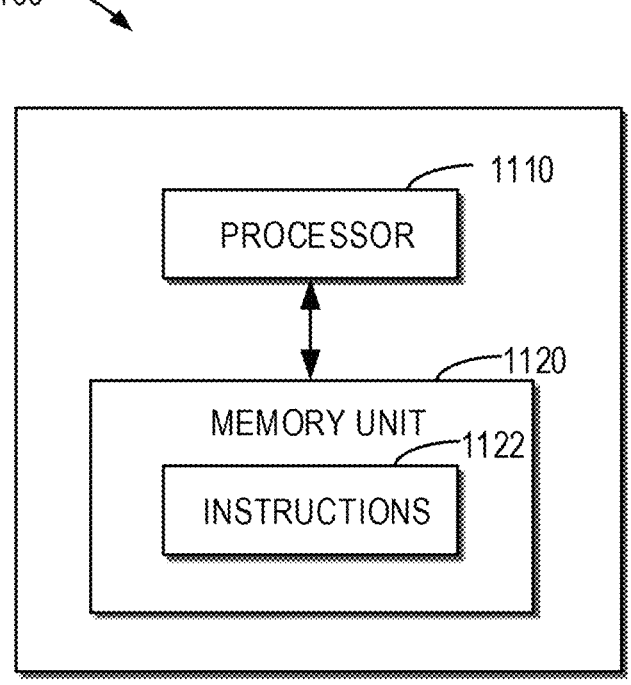
FIG. 11 illustrates a schematic diagram of a system for implementing a method in accordance with embodiments of the present disclosure.

In some embodiments of the present disclosure, a system is provided for implementing the above methods 200, 600 and/or 800. FIG. 11 illustrates a schematic diagram of a system 1100 for implementing a method in accordance with embodiments of the present disclosure. The system 1100 comprises: a computer processor 1110 coupled to a computer-readable memory unit 1120, the memory unit 1120 comprising instructions 1122 that when executed by the computer processor 1110 implements the methods 200, 600 and/or 800.

In some embodiments of the present disclosure, a computer readable medium for controlling an AGV is provided. The computer readable medium has instructions stored thereon, and the instructions, when executed on at least one processor, may cause at least one processor to perform the method for controlling an AGV as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2, 6 and 8. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling an automatic guided vehicle (AGV), the method comprising:

determining a first load identifier at a first location on a predetermined trajectory of the AGV, the first load identifier representing a first load condition at the first location;

determining a first set of values of a plurality of control parameters based on the first load identifier; and controlling a movement of the AGV based on the first set of values, wherein controlling the movement of the AGV based on the first set of values comprises:

determining, by a position sensor, a current position deviation of the AGV in relative to the predetermined trajectory;

determining a differential speed based on the current position deviation and the first set of values; and determining a left speed and a right speed for a left wheel and a right wheel of the AGV based on the differential speed.

2. The method of claim 1, further comprising:

determining, based on a plurality of load conditions of the predetermined trajectory, a plurality of segments of the predetermined trajectory, each segment being associated with a respective load identifier representing a respective load condition.

3. The method of claim 2, wherein for each segment of the plurality of segments, a load identifier marker is located at a starting point of the given segment, the load identifier marker indicating a respective load identifier of the given segment; and wherein determining the first load identifier comprises:

in response to detect the load identifier marker by a detector at the first location, determining the first load identifier based on the detected load identifier marker.

4. The method of claim 3, wherein the load identifier marker comprises one of:

a radio frequency identification (RFID) tagger, or a Quick Response (QR) code; and wherein the detector comprises one of:

a RFID tagger reader, or a QR code reader.

5. The method of claim 2, wherein controlling the movement of the AGV based on the first set of values comprises:

in accordance with a determination that the AGV is located in a first segment associated with the first load identifier, controlling the movement of the AGV based on the first set of values.

6. The method of claim 1, wherein the plurality of control parameters comprise:

a proportional gain, an integration time, and a derivation time, or wherein the plurality of control parameters comprise: a proportional gain, an integration time, a derivation time, and a filter time.

7. The method of claim 1, further comprising determining a plurality of candidate sets of values of the plurality of control parameters based on a plurality of load conditions and an estimated transfer function of the AGV, each candidate set of values being associated with a respective load identifier representing a respective load condition; and wherein determining the first set of values based on the first load identifier comprises:

selecting, from the plurality of candidate sets of values, a set of values associated with the first load identifier as the first set of values.

8. The method of claim 1, further comprising:

receiving a trigger indicating a second load identifier different from the first load identifier; and controlling the movement of the AGV based on a second set of values of the plurality of control parameters corresponding to the second load identifier, the second set of values being different from the first set of values.

9. The method of claim 1, wherein the first load condition comprises at least one of:

a weight of a load carried by the AGV, a weight of a towing cart driven by the AGV, and a friction of wheels of the AGV.

10. A method for controlling an automatic guided vehicle (AGV), the method comprising:

determining a first load identifier at a first location on a predetermined trajectory of the AGV, the first load identifier representing a first load condition at the first location;

determining a first set of values of a plurality of control parameters based on the first load identifier; and controlling a movement of the AGV based on the first set of values, wherein the plurality of control parameters comprise: a proportional gain, an integration time, and a derivation time, or wherein the plurality of control parameters comprise: a proportional gain, an integration time, a derivation time, and a filter time.

11. A method for controlling an automatic guided vehicle (AGV), the method comprising:

determining a first load identifier at a first location on a predetermined trajectory of the AGV, the first load identifier representing a first load condition at the first location;

determining a first set of values of a plurality of control parameters based on the first load identifier;

controlling a movement of the AGV based on the first set of values;

determining a plurality of candidate sets of values of the plurality of control parameters based on a plurality of load conditions and an estimated transfer function of the AGV, each candidate set of values being associated with a respective load identifier representing a respective load condition; and wherein determining the first set of values based on the first load identifier comprises:

selecting, from the plurality of candidate sets of values, a set of values associated with the first load identifier as the first set of values.

* * * * *